United States Patent [19]

Duffy

[11] Patent Number: 4,586,582
[45] Date of Patent: May 6, 1986

[54] POWER STEERING SYSTEM WITH VEHICLE SPEED-SENSITIVE FLOW

[75] Inventor: James J. Duffy, Livonia, Mich.

[73] Assignee: Ford Motor Company, Dearborn, Mich.

[21] Appl. No.: 642,466

[22] Filed: Aug. 20, 1984

Related U.S. Application Data

[63] Continuation-in-part of Ser. No. 429,417, Sep. 30, 1982, Pat. No. 4,485,883.

[51] Int. Cl.⁴ .............................................. B62D 5/06
[52] U.S. Cl. .................................................... 180/142
[58] Field of Search ...................... 180/141, 142, 143; 91/437; 60/468

[56] References Cited

U.S. PATENT DOCUMENTS

| | | | |
|---|---|---|---|
| 3,693,747 | 9/1972 | Nishikawa | 180/143 |
| 4,139,153 | 2/1979 | Engholdt | 251/133 |
| 4,300,650 | 11/1981 | Weber | 180/142 |
| 4,410,059 | 10/1983 | Nakayama | 180/143 |
| 4,473,128 | 9/1984 | Nakayama | 180/142 |

Primary Examiner—John A. Pekar
Attorney, Agent, or Firm—Donald J. Harrington; Keith L. Zerschling

[57] ABSTRACT

A power steering gear mechanism for an automotive vehicle comprising a fluid motor connected drivably to a vehicle steering gear linkage and a control valve for directing motor actuating fluid pressure to the fluid motor from a power steering pump, the control valve including a vehicle speed sensitive bypass valve and a flow control valve in the fluid circuit connecting the pump and the gear whereby a reduced flow of pressurized fluid to the gear occurs at low speeds and during parking maneuvers and wherein a lower flow of fluid is applied to the steering gear during steering maneuvers at high speeds whereby a reduction in the power assist and an increased road feel and reduced power consumption occur during operation of the vehicle at high speeds.

5 Claims, 5 Drawing Figures

POWER STEERING SYSTEM WITH VEHICLE SPEED-SENSITIVE FLOW

REFERENCE TO RELATED DISCLOSURE

This disclosure is a continuation-in-part of Ser. No. 429,417, filed 9/30/82, my U.S. Pat. No. 4,485,883, dated Dec. 4, 1984.

GENERAL DESCRIPTION OF THE INVENTION

My invention is an improvement in power steering mechanisms of the kind shown in U.S. Pat. No. 4,063,490 although it may be used in other kinds of power steering gears for automotive vehicles. The steering gear structure shown in U.S. Pat. No. 4,063,490 comprises a rack-and-pinion steering gear mechanism in which the gear rack is connected operatively to a steering gear linkage and to the piston of a fluid motor. The rack engages drivably a drive pinion that is connected to a driver operated steering shaft through a torsion rod. A rotary valve mechanism comprising a valve sleeve and an inner valve member controls distribution of pressure from a power steering pump to the fluid motor of the rack-and-pinion steering gear mechanism.

The inner valve member of the rotary valve mechanism is connected to the steering shaft and the valve sleeve with which the inner valve member cooperates is connected to the pinion. Angular deflection of the torsion rod results in relative displacement of the inner valve member with respect to the valve sleeve thereby establishing controlled pressure distribution to the fluid motor.

A power steering pump of the kind adapted for use with the present invention is shown in U.S. Pat. No. 4,199,304. Both this patent and U.S. Pat. No. 4,063,490 are assigned to the assignee of this invention.

The pump of U.S. Pat. No. 4,199,304 contains a flow control valve that establishes a constant flow delivery to the power steering gear regardless of the vehicle speed. The rotor of the pump is connected to the crankshaft of the engine through a belt drive, but the varying engine speed during vehicle operation will not cause a corresponding change in the rate of delivery of pressurized fluid to the steering gear because of the operation of the flow control valve.

In the present invention I have made provision for reducing the flow delivery to the steering gear by introducing a speed sensitive bypass valve in cooperation with a constant flow valve so that a constant part of the pressurized fluid delivered by the pump to the steering gear is subtracted thereby causing an increased road feel and reduced power consumption at high road speeds. The bypass valve may be triggered by a speed sensitive electronic module which moves the valve toward a closed position during operation of the vehicle at speeds less than a predetermined value and which moves the valve toward a more open position at higher speeds.

PARTICULAR DESCRIPTION OF THE INVENTION

Figure 3:
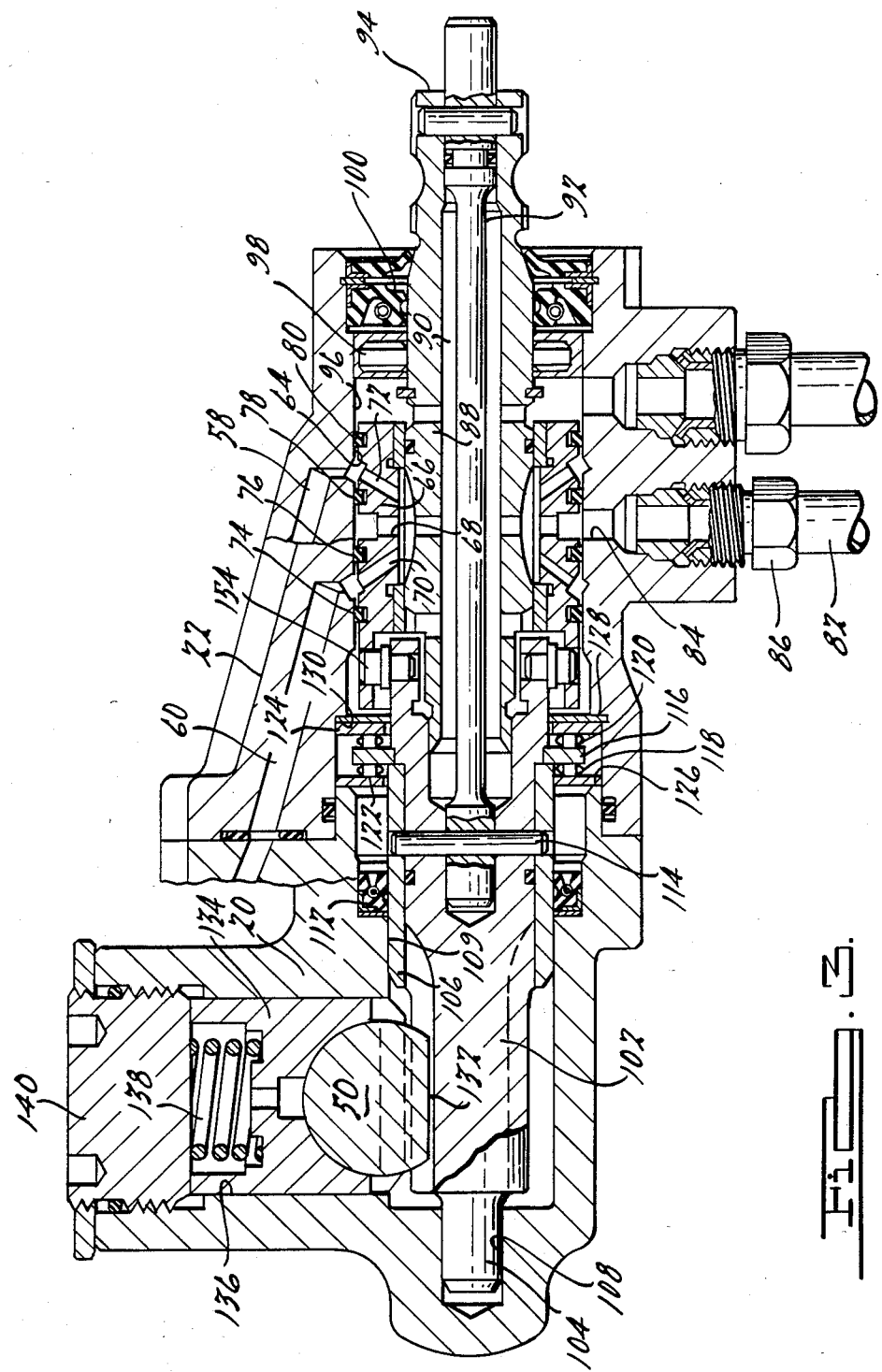
FIG. 3 is a cross-sectional view of a steering gear mechanism of the rack-and-pinion type to which the improvements of my invention may be applied.

In FIG. 3 reference character 20 identifies an end housing at one end of a power cylinder sleeve. Located at the other end of the cylinder sleeve is a remote end housing, not shown, with a central opening within which one end of the cylinder sleeve is received. Valve housing 22 is secured to the housing 20. It contains a rotary valve structure.

Pressure distribution to the right turn and left turn passages 58 and 60 is effected by the rotary valve assembly. The valve housing 22 is formed with an internal cylindrical valve cavity 64. A rotary valve sleeve 66 positioned within cavity 64 is provided with radial pressure supply ports 68 and pressure distribution ports 70 and 72 which communicate respectively with left turn pressure passage 60 and right turn pressure passage 58. The pressures in passage 60 and in port 70 are isolated, one with respect to the other, by ring seals 74 and 76 which surround the cylindrical valve element 66. These ring seals correspond to ring seals 78 and 80 surrounding valve element 66 thereby isolating the pressure in port 72 and passage 58. Seals 76 and 78 are also effective to isolate pressure in pressure supply ports 68, the latter communicating with fluid pressure inlet conduit 82 through port 84 in housing 22. A fluid fitting 86 provides a fluid tight connection between the conduit 82 and port 84.

Valve element 66 has a cylindrical internal cavity within which is positioned inner rotary valve member 88.

Valve member 88 is formed with an internal cavity 90 through which a torsion rod 92 extends. The right-hand end of the valve element 88 defines a steering shaft 94, shown in FIG. 3, which is splined or otherwise connected to a driver operated steering shaft and journalled within bearing opening 96 in housing 22 by means of a steering shaft bearing 98. Fluid seal 100 surrounds steering shaft 92 and is held in place by a snap ring as indicated.

The right-hand end of the torsion rod 92 is pinned securely to the right-hand end of steering shaft 94. The left-hand end of the torsion rod 92 is pinned at 114 or otherwise is securely connected to a drive pinion 102 journalled within housing 20. The pinion 102 is formed with end bearing portion 104 and an intermediate bearing sleeve 106. Bearing portion 104 is journalled within bearing opening 108 in the housing 20, and bearing portion 106 is journalled within bearing opening 109 at the opposite end of the housing 20.

Pinion 102 forms a part of an assembly that includes sleeve 106 about which is positioned pinion seal 112. The end of the sleeve 110, in the embodiment of FIG. 3, is secured by pin 114 to the pinion 102. The right-hand end of the sleeve 110 engages thrust reaction ring 116. Located on either side of the reaction ring 116 are radial needle bearings 118 and 120 which engage, respectively, thrust washers 122 and 124. Washer 122 is fixed in abutting relationship with respect to the end 126 of the housing 20. A Belleville thrust washer 128 is located between thrust washer 124 and an adjacent shoulder 130 formed in the interior valve opening of the housing 22. The preload on the Belleville washer 128 is sufficient to maintain the pinion 102 in a fixed axial position with respect to the housing 20. Pinion 102 engages rack teeth 132 formed on the rack 50.

The pinion 102 is formed with helical teeth. When torque is applied to the pinion 102, the resulting axial thrust in either one direction or the other is absorbed by the thrust bearing assembly shown at 116, 118 and 120. The preload on Belleville washer spring 128 is sufficient to prevent axial displacement of the pinion 102 relating to housing 20 for any design torque to which the pinion 102 may be subjected. The teeth 132 of the rack 50 are held in preloaded, zero-backlash engagement by a preload plunger 134 slidably situated in cylindrical opening 136 in housing 20. Preload force is applied to the plunger 134 by compression spring 138 which is seated on closure 140 threadably received within the end of the opening 136.

Figure 2:
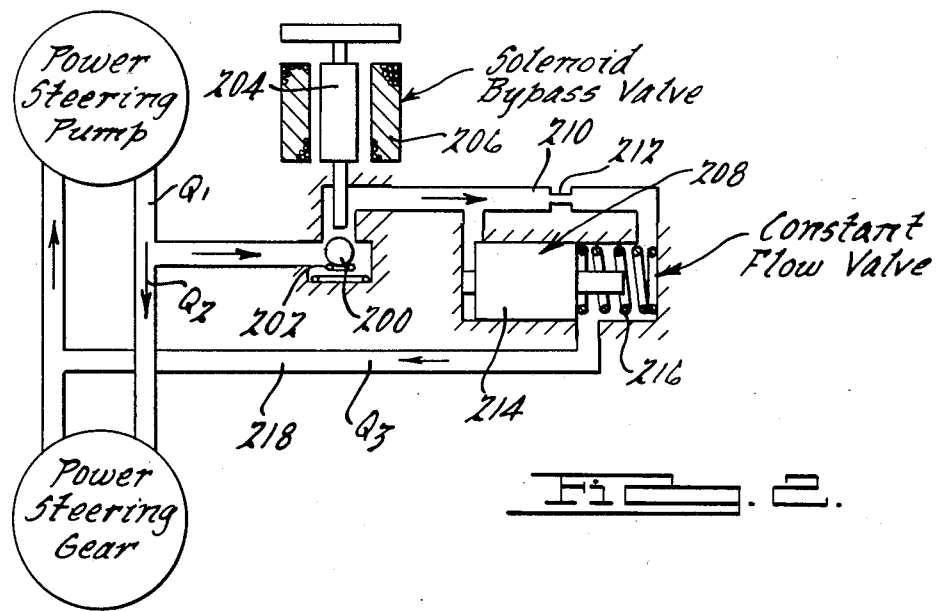
FIG. 2 is a schematic representation of a valve system for use in a pump and steering gear circuit.

The solenoid windings are schematically shown in FIG. 2 at 206. When the valve 200 is opened, a constant flow control valve 208 is supplied with fluid through branch passage 210. That branch passage comprises a flow restricting orifice 212 and the pressure differential across the orifice is applied to opposite sides of a valve element 214. The valve element normally is urged in a left-hand direction by valve spring 216.

The outlet flow $Q_3$ established by the constant flow valve is delivered to the low pressure side of the pump through branch passage 218.

Figure 1:
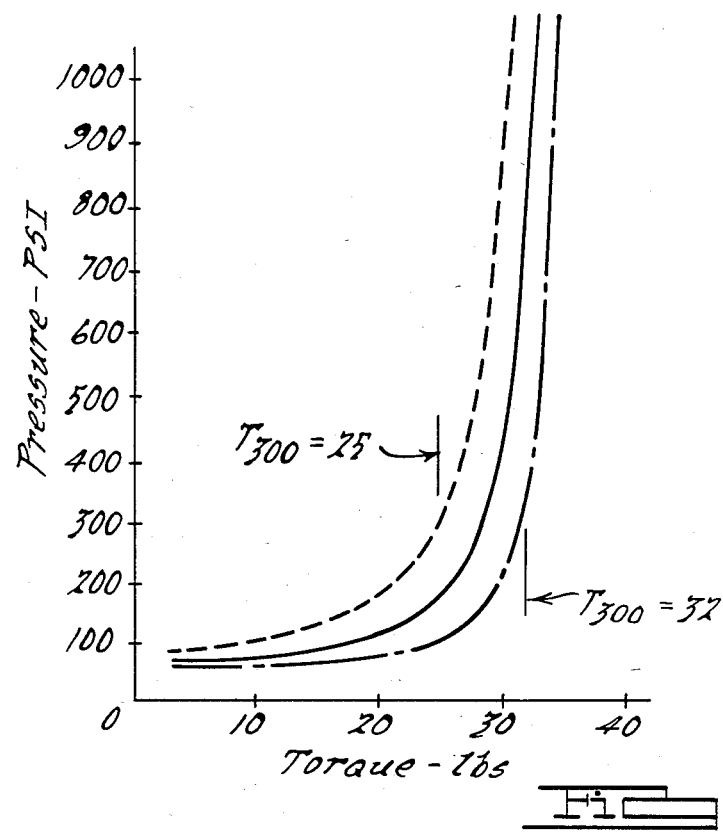
FIG. 1 is a chart that shows the relationship of pressure to torque for various effective values of flow of pressurized fluid to the steering gear.

It is thus seen that at high speeds a constant $Q_3$ flow is subtracted from the flow $Q_1$ delivered from the power steering pump to the steering gear shown in FIG. 3. This causes constant flow $Q_2$ and a change in the characteristic curve of pressure versus torque as seen in FIG. 1. When the flow is relatively high, the characteristic curve is as indicated in the left-hand part of FIG. 1 and at lower flows the characteristic curve is shifted in a right-hand direction. Thus the torque applied to the steering shaft for any given pressure is greater at low flow than it is at high flow. This results in an increased road feel and a reduction in the power assist during straight ahead high speed operation and in a decrease in road feel and an increase in power assist during steering maneuvers at low speeds as well as during parking maneuvers.

Figure 4:
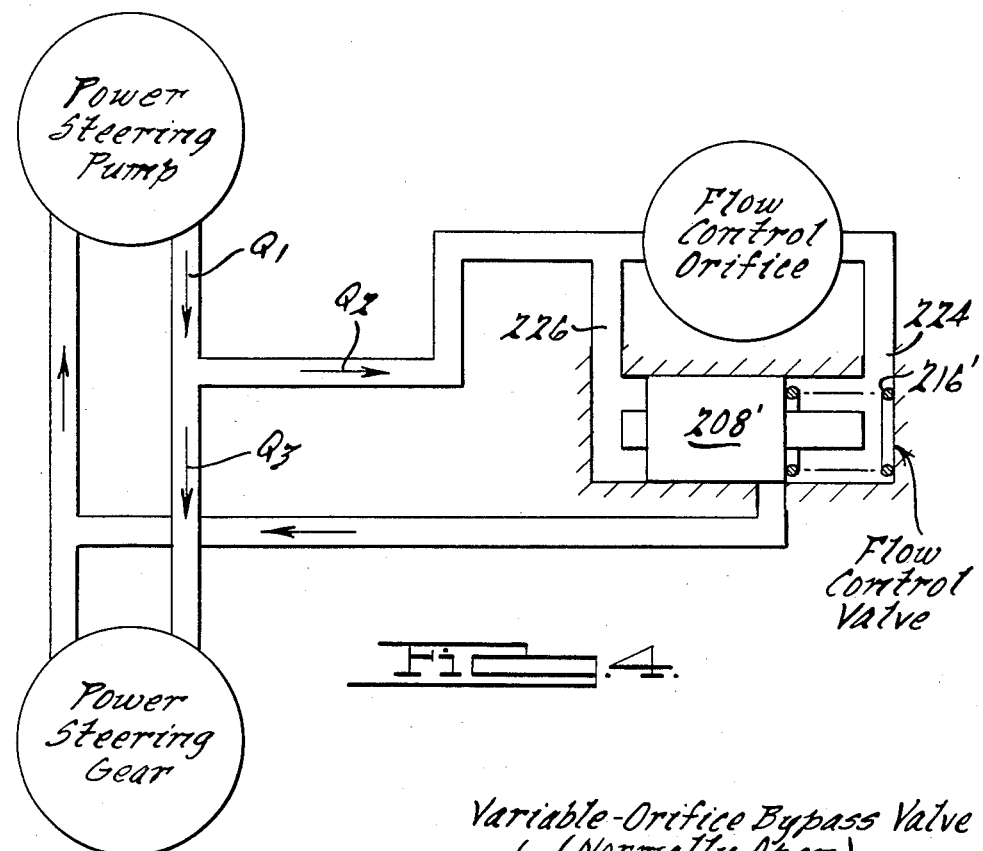
FIG. 4 is a schematic drawing of a valve system that is speed sensitive.

I have shown in FIG. 4 an embodiment of my invention that comprises a speed sensitive flow control orifice rather than a solenoid bypass valve and fixed orifice as in the FIG. 2 arrangement. As in the case of FIG. 2, the flow $Q_1$ from the pump is constant. The flow $Q_3$ to the gear is varied as a function of vehicle speed. By varying the size of the flow control orifice in accordance with a desired schedule that depends upon vehicle speed, the bypass flow $Q_2$ may be set at a desired constant value at each speed. Then $Q_3$, which equals $Q_1$ minus $Q_2$, varies with road speed as desired.

Figure 4A:
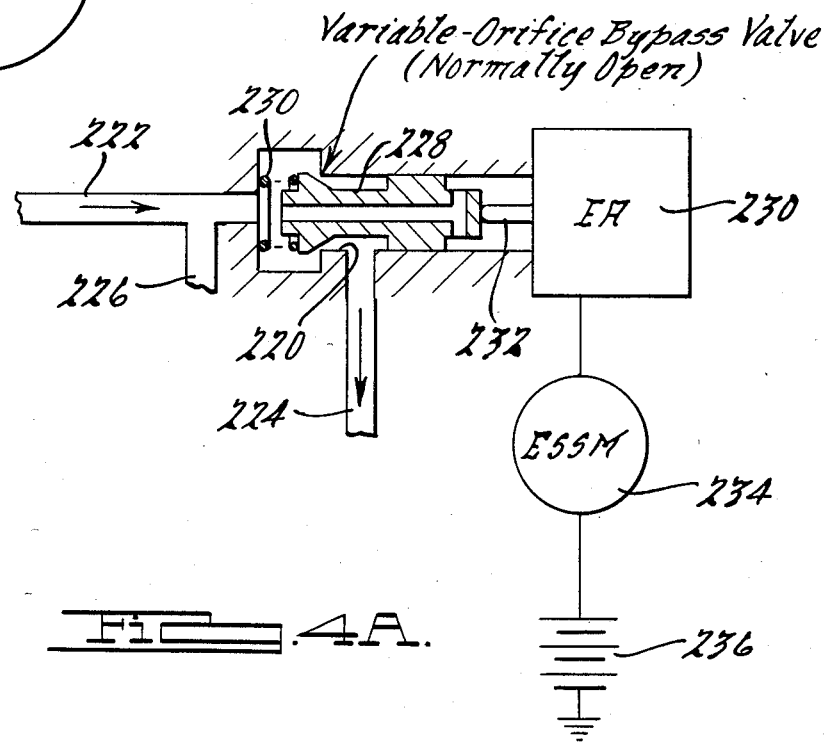
FIG. 4A is a detailed schematic drawing of the speed sensitive control orifice of FIG. 4.

The variation of the flow control orifice size can be varied by the mechanism of FIG. 4A. In FIG. 4A a variable orifice 220 is located in the bypass passage 222. The downstream side of the orifice 220 communicates with control passage 224, which acts on valve 208 to supplement the force of spring 216'. Valve 208' and spring 216' correspond to valve 208 and spring 216, respectively, shown in FIG. 2. The left side of valve 208' communicates with the upstream side of the orifice 220 through control passage 226.

A metering valve 228 registers with orifice 220. It has a tapered part that progressively closes orifice 220 when it is adjusted toward the orifice. The metering valve adjustment is made by a screw-type actuator 230 which has a screw 232 that engages valve 228. The force applied to the valve 228 by the screw is opposed by spring 230.

The actuator 230 includes an electric reversible motor that is under the control of an electric vehicle speed sensing module 234. The power source is the vehicle battery 236.

The bypass flow control elements may be mounted in the power steering hose system rather than in the pump. This feature provides component packaging advantages in some vehicles.

Having thus described a preferred form of my invention, what I claim and desire to secure by U.S. Letters Patent is:

1. A power steering gear system for an automotive vehicle comprising a power steering pump and a fluid pressure operated steering gear;

passages connecting the pump and the steering gear including branch passage portions extending from the high pressure side of said pump to the low pressure side thereof;

a speed sensitive bypass valve means including a variable size orifice in said branch portions for controlling the flow bypassed from said high pressure side to said low pressure side and a constant flow valve means in said branch portions for regulating the flow bypassed from said high pressure side to said low pressure side whereby a constant volume of fluid delivered by said pump is bypassed to the said low pressure side when said bypass valve means is open, whereby a constant volume of fluid delivered by said pump is bypassed to said low pressure side at any given vehicle speed.

2. The combination as set forth in claim 1 wherein said speed sensitive bypass valve means comprises a vehicle speed sensitive actuator adapted to progressively open the branch portions in response to increasing vehicle speed thereby increasing road feel and reducing power assist during high speed turning maneuvers.

3. The combination as set forth in claim 2 wherein said speed sensitive actuator comprises an electric motor with a movable armature, said armature engaging and opening a valve element of said bypass valve means when the motor is energized.

4. The combination as set forth in claim 1 wherein said speed sensitive bypass valve means comprises a movable flow valve element in said branch passage portions adapted to move in one direction to restrict said bypass passages, spring means urging said flow valve element in the opposite direction, the pressure differential across said orifice creating on said flow valve element a pressure force that opposes the force of said spring means.

5. The combination as set forth in claim 2 wherein said speed sensitive bypass valve means comprises a movable flow valve element in said branch passage portions adapted to move in one direction to restrict said bypass passages, spring means urging said flow valve element in the opposite direction, the pressure differential across said orifice creating on said flow valve element a pressure force that opposes the force of said spring means.

* * * * *